US012669694B2

(12) United States Patent　　(10) Patent No.: US 12,669,694 B2
Madar et al.　　(45) Date of Patent: *Jun. 30, 2026

(54) ACCELERATING DIGITAL MICROSCOPY SCANS USING EMPTY/DIRTY AREA DETECTION

(71) Applicant: SCOPIO LABS LTD., Tel Aviv (IL)

(72) Inventors: Ittai Madar, Tel Aviv (IL); Eran Small, Yehud (IL); Itai Hayut, Tel Aviv (IL); Erez Na'Aman, Tel Aviv (IL)

(73) Assignee: SCOPIO LABS LTD., Tel Aviv (IL)

( * ) Notice: Subject to any disclaimer, the term of this patent is extended or adjusted under 35 U.S.C. 154(b) by 240 days.

This patent is subject to a terminal disclaimer.

(21) Appl. No.: 18/514,050

(22) Filed: Nov. 20, 2023

(65) Prior Publication Data

US 2024/0085688 A1　　Mar. 14, 2024

Related U.S. Application Data

(63) Continuation of application No. 17/812,374, filed on Jul. 13, 2022, now Pat. No. 11,828,927, which is a
(Continued)

(51) Int. Cl.
G02B 21/36　　(2006.01)
G02B 21/00　　(2006.01)
G02B 21/12　　(2006.01)

(52) U.S. Cl.
CPC ....... G02B 21/367 (2013.01); G02B 21/0084 (2013.01); G02B 21/125 (2013.01)

(58) Field of Classification Search
CPC ............. G02B 21/367; G02B 21/0084; G02B 21/125; G02B 21/00; G02B 21/0004;
(Continued)

(56) References Cited

U.S. PATENT DOCUMENTS 5,671,085 A　　9/1997　Gustafsson
6,084,991 A　　7/2000　Sampas
(Continued)

FOREIGN PATENT DOCUMENTS

JP　　2014044360　　　　3/2014
WO　　2013015740 A1　　1/2013
(Continued)

OTHER PUBLICATIONS

Gryanik, A., et al., "Automatic Image Quantification for Structural Analysis of in vitro Dermal Samples," Biomed Tech; 57 (Supp. 1):494-497 (2012).
(Continued)

*Primary Examiner* — Arnel C Lavarias
(74) *Attorney, Agent, or Firm* — FisherBroyles, LLP; John K. Shimmick

(57) ABSTRACT

A microscope including an illumination assembly, an image capture device and a processor can be configured to selectively identify regions of a sample including artifacts or empty space. By selectively identifying regions of the sample that have artifacts or empty space, the amount of time to generate an image of the sample and resources used to generate the image can be decreased substantially while providing high resolution for appropriate regions of the computational image. The processor can be configured to change the imaging process in response to regions of the sample that includes artifacts or empty space. The imaging process may include a higher resolution process to output higher resolution portions of the computational image for sample regions including valid sample material, and a lower resolution process to output lower resolution portions of the computational image for sample regions including valid sample material.

18 Claims, 4 Drawing Sheets

Related U.S. Application Data continuation of application No. 16/875,721, filed on May 15, 2020, now Pat. No. 11,409,095, which is a continuation of application No. PCT/IL2018/051253, filed on Nov. 20, 2018.

(60) Provisional application No. 62/588,658, filed on Nov. 20, 2017.

(58) Field of Classification Search
CPC ........ G02B 21/08; G02B 21/06; G02B 21/36; G02B 21/361; G02B 21/365
USPC ................ 359/385, 362, 363, 368, 369, 388
See application file for complete search history.

(56) References Cited

U.S. PATENT DOCUMENTS

| | | | |
|---|---|---|---|
| 6,804,011 B2 | 10/2004 | Kuechel | |
| 8,253,789 B2 | 8/2012 | Aizaki | |
| 8,565,503 B2 | 10/2013 | Eichhorn | |
| 9,817,224 B2 | 11/2017 | Zheng | |
| 9,824,259 B2 | 11/2017 | Liebel | |
| 10,169,852 B1 | 1/2019 | Putman | |
| 10,558,029 B2 | 2/2020 | Leshem | |
| 10,705,326 B2 | 7/2020 | Small | |
| 11,409,095 B2* | 8/2022 | Madar | G02B 21/002 |
| 11,828,927 B2* | 11/2023 | Madar | G02B 21/0084 |
| 2004/0120562 A1* | 6/2004 | Hays | G02B 21/367 |
| | | | 382/128 |
| 2007/0140543 A1* | 6/2007 | D'Errico | G01N 15/1433 |
| | | | 382/133 |
| 2014/0226003 A1 | 8/2014 | Phaneuf | |
| 2017/0261741 A1 | 9/2017 | Stoppe | |
| 2018/0348500 A1 | 12/2018 | Naaman, III | |
| 2018/0373016 A1 | 12/2018 | Leshem, III | |
| 2019/0072751 A1 | 3/2019 | Rainbolt | |
| 2019/0101736 A1 | 4/2019 | Chen | |
| 2019/0235224 A1 | 8/2019 | Small | |
| 2019/0384962 A1 | 12/2019 | Hayut | |
| 2020/0041780 A1 | 2/2020 | Na'Aman | |
| 2020/0278362 A1 | 9/2020 | Hayut | |
| 2020/0278530 A1 | 9/2020 | Madar | |
| 2020/0302144 A1 | 9/2020 | Leshem | |

FOREIGN PATENT DOCUMENTS

| | | |
|---|---|---|
| WO | 2014075764 A1 | 5/2014 |
| WO | 2017081539 | 5/2017 |
| WO | 2017081540 | 5/2017 |
| WO | 2017081541 | 5/2017 |
| WO | 2017081542 | 5/2017 |
| WO | 2018078447 | 5/2018 |
| WO | 2018078448 | 5/2018 |
| WO | 2019077610 | 4/2019 |
| WO | 2019097523 | 5/2019 |
| WO | 2019097524 | 5/2019 |
| WO | 2020129064 | 6/2020 |
| WO | 2021095037 | 5/2021 |
| WO | 2022097155 | 5/2022 |
| WO | 2022107132 | 5/2022 |
| WO | 2022249191 | 12/2022 |
| WO | 2023089611 | 5/2023 |
| WO | 2023161932 | 8/2023 |

OTHER PUBLICATIONS

International Search Report and Written Opinion for International Application No. PCT/IL2018/051253, 17 pages (Mar. 5, 2019).

* cited by examiner

ACCELERATING DIGITAL MICROSCOPY SCANS USING EMPTY/DIRTY AREA DETECTION

RELATED APPLICATIONS

This application is a continuation of U.S. patent application Ser. No. 17/812,374, filed Jul. 13, 2022, which is a continuation of U.S. patent application Ser. No. 16/875,721, filed May 15, 2020, now U.S. Pat. No. 11,409,095, issued Aug. 9, 2022, which is a bypass continuation of International Application No. PCT/IL2018/051253, filed Nov. 20, 2018, published as WO 2019/097524, on May 23, 2019, and claims the benefit under 35 U.S.C. § 119(e) of U.S. Provisional Application No. 62/588,658, filed Nov. 20, 2017, the disclosures of which are incorporated, in their entirety, by this reference.

BACKGROUND

The present disclosure relates generally to digital microscopy and/or computational microscopy and, more specifically, to systems and methods for accelerating digital microscopy by detecting sample artifacts and empty areas of the sample.

Microscopy is used in several applications and use cases to analyze samples, such as a hospital, a lab or a clinic. A large volume of slides may need to be read at a microscope facility, and the throughput of such systems can be less than ideal. Commercial microscopes, such as whole slide imaging (WSI) devices that are currently available, often comprise a single scanning microscope that relies primarily on accurate mechanical scanning and high-quality objective lenses. Recently computational microscopy has been proposed as a way of improving the resolution of optical images. With computational microscopy, a plurality of images of the sample can be obtained and processed to improve resolution and quality.

With these prior approaches to microscopy, the throughput may still be limited by the speed in which the scanning microscope can scan a single slide, and by the computational time to generate the image in at least some instances. The prior approaches may less than ideally allocate microscope and processing resources and may sample and process more sample data than would be ideal. This can result in delays, resulting in less than ideal throughput.

Some facilities such as pathology labs and hospitals may scan several microscope samples, and the throughput of the prior systems can be less than ideal. For example, some samples such as frozen samples, may need to be read quickly, while other samples may be less time sensitive. In addition, some samples may be read while a patient is in surgery to determine how to treat the patient surgically. Also, the samples obtained from tissue and other objects may contain artifacts or empty regions that are not helpful in evaluating the sample. For example, with some tissue samples such as needle biopsies and microtomes, the sample on the microscope slide can be distributed unevenly.

The prior approaches to microscopy may scan more of the sample than would be ideal. For example, regions that contain artifacts or empty space may not be helpful in evaluating the sample. Examples of artifacts include particulate matter, dust, dirt, debris, and smudges. The artifacts and empty space on the sample will generally not be helpful in analyzing the sample. The prior approaches to microscopy can scan and process these regions with artifacts and empty space with resources similar to other regions that contain useful sample material, resulting less than ideal throughput for the output images.

In light of the above, it would be desirable to have improved methods and apparatus for increasing microscope imaging throughput at facility. Ideally, such improved microscope systems would overcome at least some of the aforementioned limitations of the prior approaches.

SUMMARY

As will be described in greater detail below, the instant disclosure describes various systems and methods for improving throughput of microscopes such as computational microscopes. A microscope comprising an illumination assembly, an image capture device and a processor can be configured to selectively identify regions of a sample comprising artifacts or empty space. By selectively identifying regions of the sample that have artifacts or empty space, the amount of time to generate an image of the sample and resources used to generate the image can be decreased substantially while providing high resolution for appropriate regions of the output image. The can be processor configured to change the imaging process in response to regions of the sample that comprises artifacts or empty space. The imaging process may comprise a higher resolution process to output higher resolution portions of the computational image for sample regions comprising valid sample material, and a lower resolution process to output lower resolution portions of the computational image for sample regions comprising valid sample material.

In an aspect, a microscope comprise an illumination assemble, an image capture device, and a processor. The illumination assembly can be operable to illuminate a sample under observation of the microscope. The image capture device can be operable to capture an initial image set of the illuminated sample. The processor can be coupled to the image capture device and configured with instructions to identify an area of the sample that comprises at least one of artifact or empty space, and to determine a process for generating a computational image of the sample in response to identifying the area.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
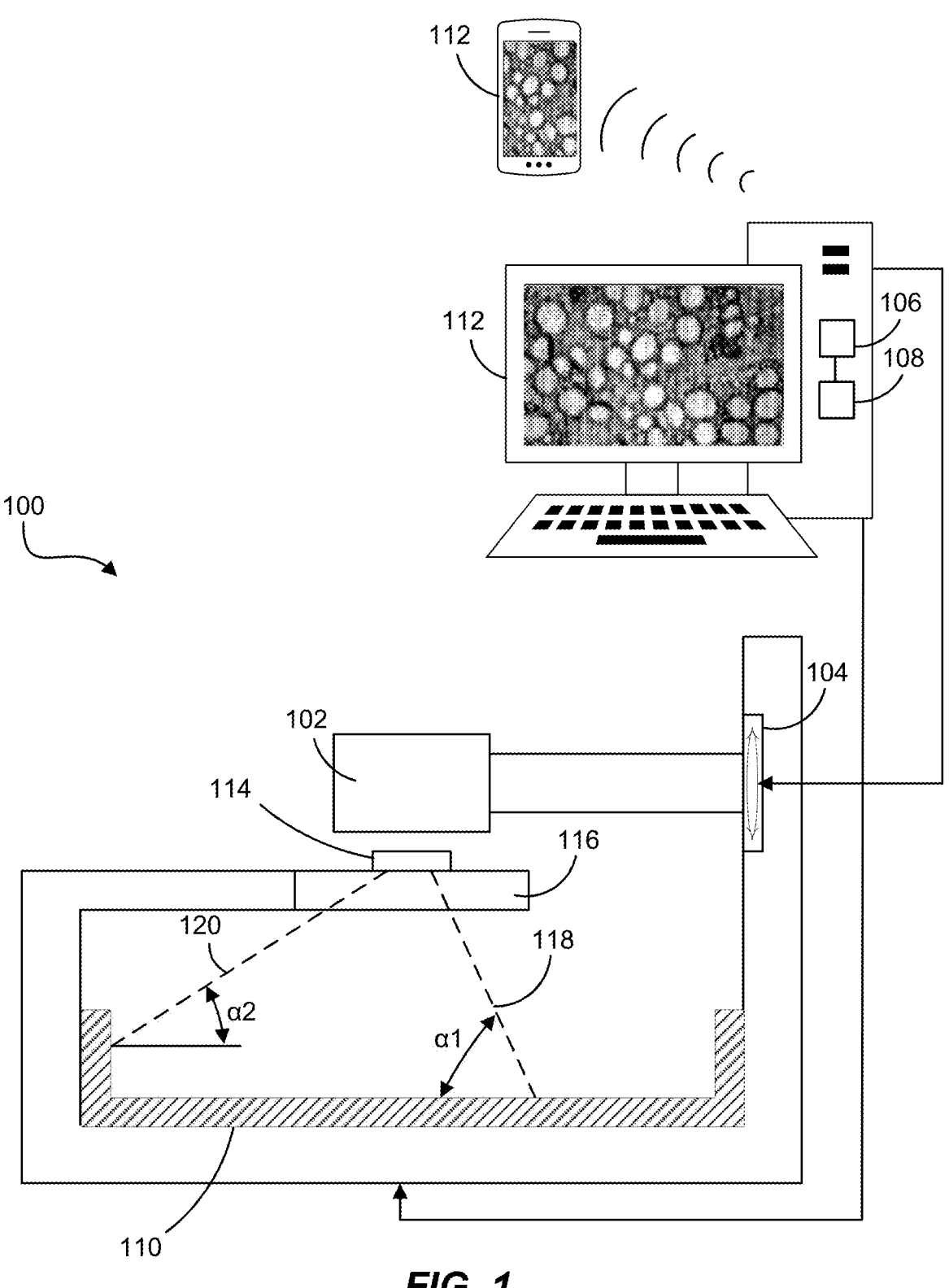
FIG. 1 is a diagram of an exemplary microscope, in accordance with some embodiments of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The presently disclosed microscope methods and apparatus disclosed herein can be used to measure many types of samples and generate computational images. The microscope can be configured to measure regions that comprise artifacts or are empty or dirty, for example. In some embodiments, the images may comprise a computational image, although the present disclosure will find applications in other fields. By selectively identifying regions of the sample that are less useful, the speed of the imaging process can be increased. The methods and apparatus disclosed herein are well suited for use with one or more components of prior systems. For example, the microscope methods and apparatus disclosed herein can be readily incorporated into prior systems, for example with a software upgrade.

The artifact as described herein such as particulate matter, e.g. dust or debris, may be located from a focal plane of the microscope or within it. The processor can be configured with instructions to determine whether specific artifacts, portions or areas of the processed images originate from locations away from the focal plane, for example by exhibiting different shifts among an image set in response to a different illumination angle of the illumination beam.

FIG. 1 is a diagrammatic representation of a microscope 100 consistent with the exemplary disclosed embodiments. The term "microscope" as used herein generally refers to any device or instrument for magnifying an object which is smaller than easily observable by the naked eye, i.e., creating an image of an object for a user where the image is larger than the object. One type of microscope may be an "optical microscope" that uses light in combination with an optical system for magnifying an object. An optical microscope may be a simple microscope having one or more magnifying lens. Another type of microscope may be a "computational microscope" that comprises an image sensor and image-processing algorithms to enhance or magnify the object's size or other properties. Enhancements may include resolution enhancement, quality improvement (e.g., aberration correction, computational refocusing, contrast enhancement, distortion correction, color enhancement, registration, removing certain elements of the data, etc.). The computational microscope may be a dedicated device or created by incorporating software and/or hardware with an existing optical microscope to produce high-resolution digital images. As shown in FIG. 1, microscope 100 comprises an image capture device 102, a focus actuator 104, a controller 106 connected to memory 108, an illumination assembly 110, and a user interface 112. An example usage of microscope 100 may be capturing images of a sample 114 mounted on a stage 116 located within the field-of-view (FOV) of image capture device 102, processing the captured images, and presenting on user interface 112 a magnified image of sample 114.

Image capture device 102 may be used to capture images of sample 114. In this specification, the term "image capture device" as used herein generally refers to a device that records the optical signals entering a lens as an image or a sequence of images. The optical signals may be in the near-infrared, infrared, visible, and ultraviolet spectrums. Examples of an image capture device comprise a CCD camera, a CMOS camera, a photo sensor array, a video camera, a mobile phone equipped with a camera, a webcam, a preview camera, a microscope objective and detector, etc. Some embodiments may comprise only a single image capture device 102, while other embodiments may comprise two, three, or even four or more image capture devices 102. In some embodiments, image capture device 102 may be configured to capture images in a defined field-of-view (FOV). Also, when microscope 100 comprises several image capture devices 102, image capture devices 102 may have overlap areas in their respective FOVs. Image capture device 102 may have one or more image sensors (not shown in FIG. 1) for capturing image data of sample 114. In other embodiments, image capture device 102 may be configured to capture images at an image resolution higher than VGA, higher than 1 Megapixel, higher than 2 Megapixels, higher than 5 Megapixels, 10 Megapixels, higher than 12 Megapixels, higher than 15 Megapixels, or higher than 20 Megapixels. In addition, image capture device 102 may also be configured to have a pixel size smaller than 15 micrometers, smaller than 10 micrometers, smaller than 5 micrometers, smaller than 3 micrometers, or smaller than 1.6 micrometer.

In some embodiments, microscope 100 comprises focus actuator 104. The term "focus actuator" as used herein generally refers to any device capable of converting input signals into physical motion or changing ray convergence for adjusting the relative distance between sample 114 and image capture device 102. Various focus actuators may be used, including, for example, linear motors, electrostrictive actuators, electrostatic motors, capacitive motors, voice coil actuators, magnetostrictive actuators, liquid lenses, etc. In some embodiments, focus actuator 104 may comprise an analog position feedback sensor and/or a digital position feedback element. Focus actuator 104 is configured to receive instructions from controller 106 in order to make light beams converge to form a clear and sharply defined image of sample 114. In the example illustrated in FIG. 1, focus actuator 104 may be configured to adjust the distance by moving image capture device 102.

However, in other embodiments, focus actuator 104 may be configured to adjust the distance by moving stage 116, or by moving both image capture device 102 and stage 116. Microscope 100 may also comprise controller 106 for controlling the operation of microscope 100 according to the disclosed embodiments. Controller 106 may comprise various types of devices for performing logic operations on one or more inputs of image data and other data according to stored or accessible software instructions providing desired functionality. For example, controller 106 may comprise a central processing unit (CPU), support circuits, digital signal processors, integrated circuits, cache memory, or any other types of devices for image processing and analysis such as graphic processing units (GPUs). The CPU may comprise any number of microcontrollers or microprocessors configured to process the imagery from the image sensors. For example, the CPU may comprise any type of single- or multi-core processor, mobile device microcontroller, etc.

Various processors may be used, including, for example, processors available from manufacturers such as Intel®, AMD®, etc. and may comprise various architectures (e.g., x86 processor, ARM®, etc.). The support circuits may be any number of circuits generally well known in the art, including cache, power supply, clock and input-output circuits. Controller 106 may be at a remote location, such as a computing device communicatively coupled to microscope 100.

In some embodiments, controller 106 may be associated with memory 108 used for storing software that, when executed by controller 106, controls the operation of microscope 100. In addition, memory 108 may also store electronic data associated with operation of microscope 100 such as, for example, captured or generated images of sample 114. In one instance, memory 108 may be integrated into the controller 106. In another instance, memory 108 may be separated from the controller 106.

Specifically, memory 108 may refer to multiple structures or computer-readable storage mediums located at controller 106 or at a remote location, such as a cloud server. Memory 108 may comprise any number of random access memories, read only memories, flash memories, disk drives, optical storage, tape storage, removable storage and other types of storage.

Microscope 100 may comprise illumination assembly 110. The term "illumination assembly" as used herein generally refers to any device or system capable of projecting light to illuminate sample 114.

Illumination assembly 110 may comprise any number of light sources, such as light emitting diodes (LEDs), LED array, lasers, and lamps configured to emit light, such as a halogen lamp, an incandescent lamp, or a sodium lamp. In one embodiment, illumination assembly 110 may comprise only a single light source. Alternatively, illumination assembly 110 may comprise four, sixteen, or even more than a hundred light sources organized in an array or a matrix. In some embodiments, illumination assembly 110 may use one or more light sources located at a surface parallel to illuminate sample 114. In other embodiments, illumination assembly 110 may use one or more light sources located at a surface perpendicular or at an angle to sample 114. Illumination assembly 110 may comprise other optical elements, such as lenses, mirrors, diffusers, active or passive phase elements, intensity elements, etc.

In addition, illumination assembly 110 may be configured to illuminate sample 114 in a series of different illumination conditions. In one example, illumination assembly 110 may comprise a plurality of light sources arranged in different illumination angles, such as a two-dimensional arrangement of light sources. In this case, the different illumination conditions may comprise different illumination angles. For example, FIG. 1 depicts a beam 118 projected from a first illumination angle α1, and a beam 120 projected from a second illumination angle α2. In some embodiments, first illumination angle α1 and second illumination angle α2 may have the same value but opposite sign. In other embodiments, first illumination angle α1 may be separated from second illumination angle α2. However, both angles originate from points within the acceptance angle of the optics. In another example, illumination assembly 110 may comprise a plurality of light sources configured to emit light in different wavelengths. In this case, the different illumination conditions may comprise different wavelengths. In yet another example, illumination assembly 110 may configured to use a number of light sources at predetermined times. In this case, the different illumination conditions may comprise different illumination patterns. Accordingly and consistent with the present disclosure, the different illumination conditions may be selected from a group including: different durations, different intensities, different positions, different illumination angles, different illumination patterns, different wavelengths, or any combination thereof.

Consistent with disclosed embodiments, microscope 100 may comprise, be connected with, or in communication with (e.g., over a network, via dedicated connection (e.g., HDMI, VGA, RGB, Coaxial) or wirelessly, e.g., via Bluetooth or WiFi) user interface 112. The term "user interface" as used herein generally refers to any device suitable for presenting a magnified image of sample 114 or any device suitable for receiving inputs from one or more users of microscope 100. FIG. 1 illustrates two examples of user interface 112. The first example is a smartphone or a tablet wirelessly communicating with controller 106 over a Bluetooth, cellular connection or a Wi-Fi connection, directly or through a remote server. The second example is a PC display or monitor physically connected to controller 106. In some embodiments, user interface 112 may comprise user output devices, including, for example, a display, tactile device, speaker, etc. In other embodiments, user interface 112 may comprise user input devices, including, for example, a touchscreen, microphone, keyboard, pointer devices, cameras, knobs, buttons, etc. With such input devices, a user may be able to provide information inputs or commands to microscope 100 by typing instructions or information, providing voice commands, selecting menu options on a screen using buttons, pointers, or eye-tracking capabilities, or through any other suitable techniques for communicating information to microscope 100. User interface 112 may be connected (physically or wirelessly) with one or more processing devices, such as controller 106, to provide and receive information to or from a user and process that information. In some embodiments, such processing devices may execute instructions for responding to keyboard entries or menu selections, recognizing and interpreting touches and/or gestures made on a touchscreen, recognizing and tracking eye movements, receiving and interpreting voice commands, etc.

Microscope 100 may also comprise or be connected to stage 116. Stage 116 comprises any horizontal rigid surface where sample 114 may be mounted for examination. Stage 116 may comprise a mechanical connector for retaining a slide containing sample 114 in a fixed position. The mechanical connector may use one or more of the following: a mount, an attaching member, a holding arm, a clamp, a clip, an adjustable frame, a locking mechanism, a spring or any combination thereof. In some embodiments, stage 116 may comprise a translucent portion or an opening for allowing light to illuminate sample 114. For example, light transmitted from illumination assembly 110 may pass through sample 114 and towards image capture device 102. In some embodiments, stage 116 and/or sample 114 may be moved using motors or manual controls in the XY plane to enable imaging of multiple areas of the sample.

Figure 2:
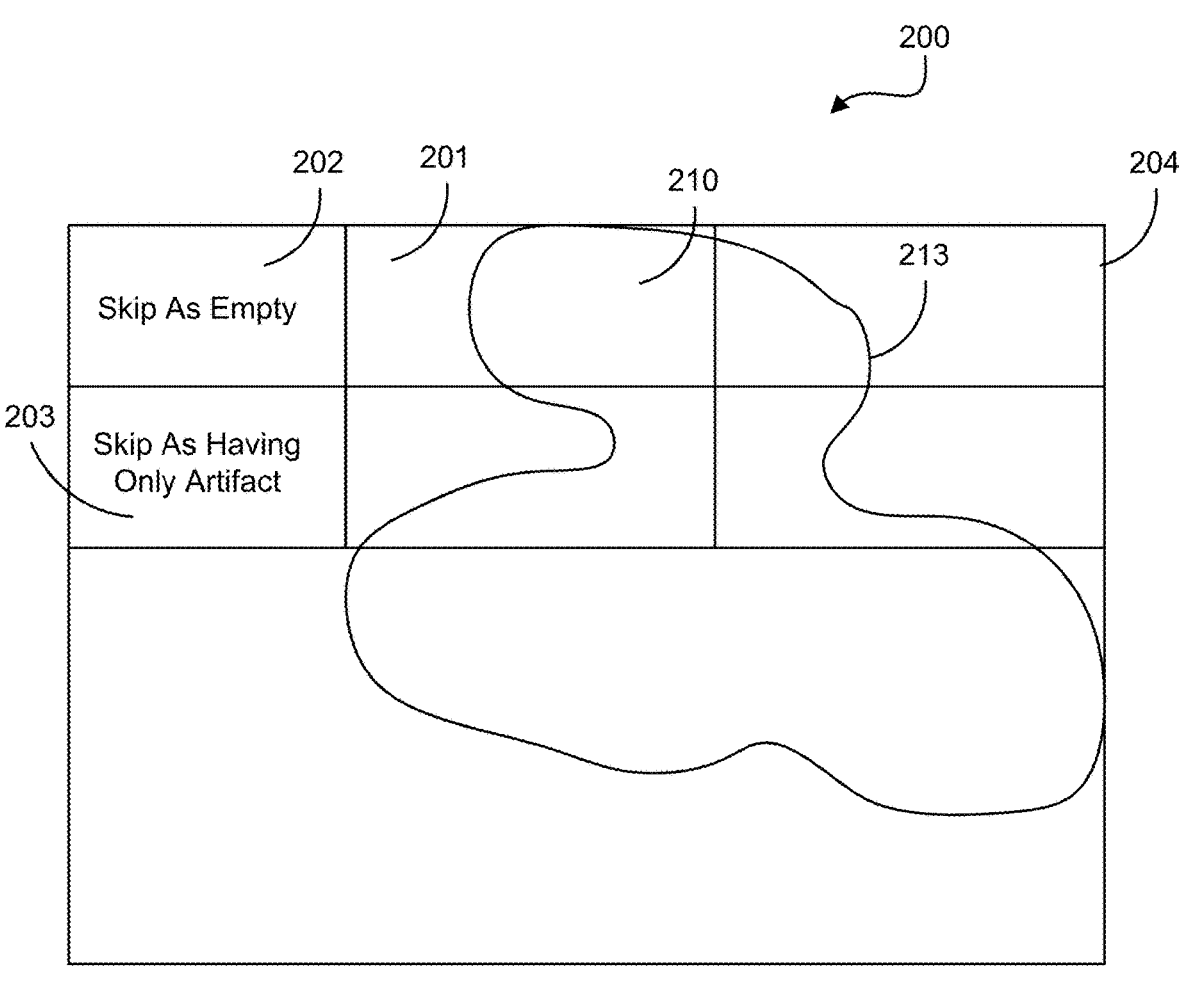
FIG. 2 is a diagram of an exemplary sample under observation, in accordance with some embodiments of the present disclosure.

FIG. 2 is a diagram of an exemplary sample 200 comprising a plurality of areas or regions, in which some of the areas comprise valid sample portions and other areas comprise one or more of artifacts or empty space. The sample 200 may comprise a plurality of areas that can be evaluated to determine whether the areas comprises valid sample data, artifacts or empty space. The sample 200 may comprise a valid portion 210 generally extending across a plurality of areas. In some embodiments, the valid portion 210 of the sample 200 comprises an edge 213, which may extend through a plurality of imaged areas of the sample. The plurality of areas may comprise a first area 201. The first area may comprise a valid portion of the sample and an unreliable portion of the sample comprising artifact or empty space. For example, the plurality of areas may comprise an empty area 202, corresponding to voids in the valid portion. The empty area 202 can be identified by the microscope comprising the processor as described herein, and the processor can change the imaging process in response to the identified area. The plurality of areas may comprise a third area 203 comprising artifacts as described herein such as particulate matter, for example. The sample 200 may comprise a fourth area 204 comprising a portion of valid sample over at least a portion of the region. Valid portion 210 may comprise material such as biological material that is of interest and can be used to generate high resolution images. The microscope 100 may be configured to change the imaging process for some areas of the sample and may only partially process areas 202 and 203, for example. This has the advantage of reducing processing by microscope 100 and expediting computational or other imaging of sample 200. Although reference is made to a plurality of images of the sample, a single image can be processed in accordance with the present disclosure. Also, the image set used to generate the computational microscopy images as disclosed herein may comprise a single image, or a plurality of images, for example. The regions of the sample comprising at least a portion of the valid sample, such as regions 201 and 204 can be imaged with higher resolution.

The processor can be configured with instructions to generate the computational image in accordance with regions corresponding to the identified areas of the sample comprising valid sample data, artifacts or empty space. For example, the computational image may comprise a higher spatial resolving power at regions corresponding to valid portion 210, and lower spatial resolving power at regions outside valid portion 210. For example, regions of the computational image corresponding to region 202 and 203 may comprise lower spatial resolving power. In some embodiments, the lower resolution image comprises the same number of pixel density as other regions, which can be generated by empty magnification or interpolation. These approaches can provide pixel resolution enhancement without increasing spatial resolving power of the portion image, and the processor can be configured with appropriate instructions.

Figure 3:
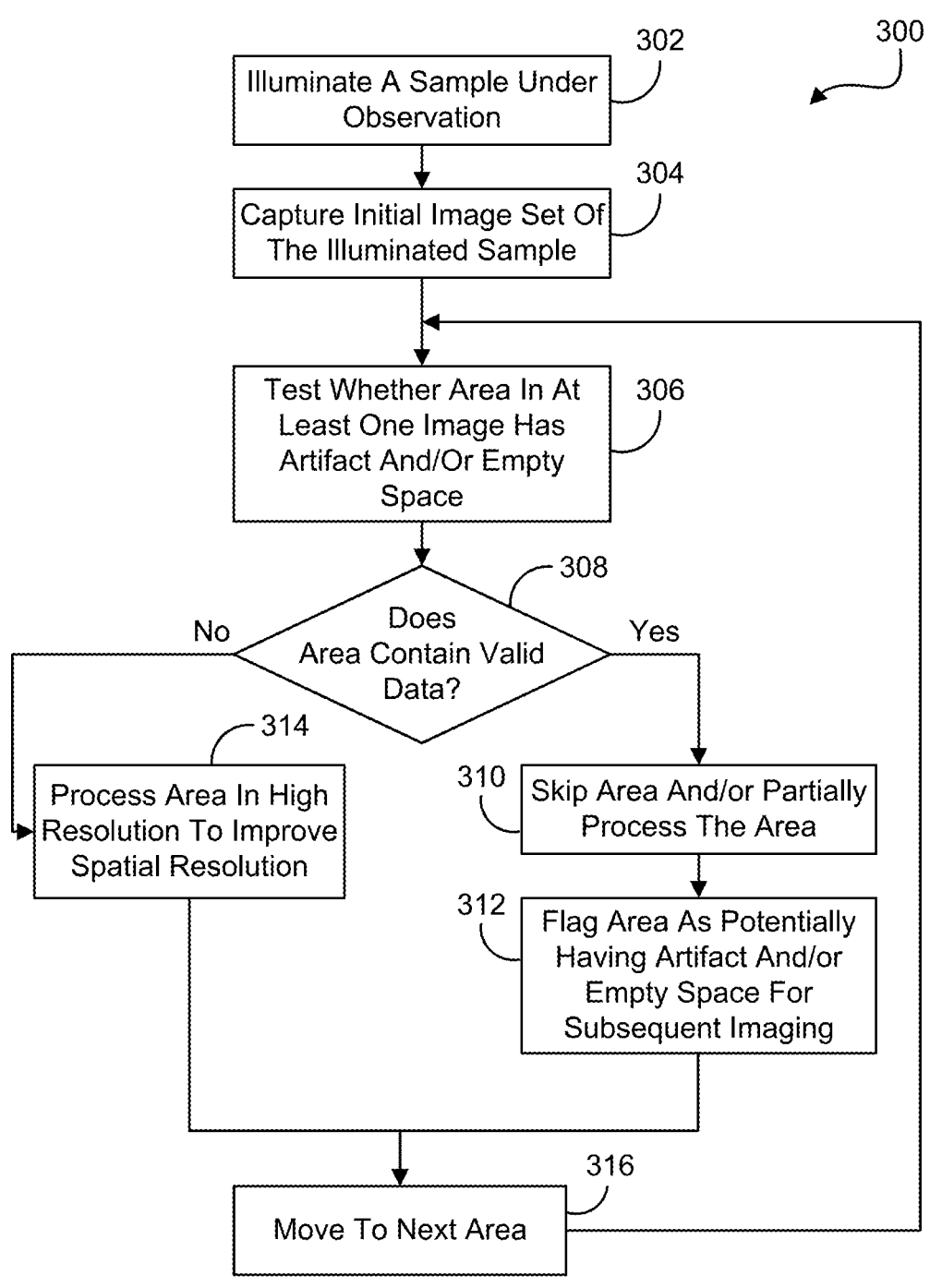
FIG. 3 is a flowchart showing an exemplary process for accelerating digital microscopy scans using an empty and/or dirty area detection, in accordance with some embodiments of the present disclosure.

FIG. 3 is a flowchart showing an exemplary process 300 for accelerating digital microscopy scans using an empty and/or dirty area detection. In this embodiment, microscope 100 illuminates a sample, such as sample 200 of FIG. 2, under observation, at step 302. Image capture device 102 of microscope 100 captures an initial image set of the illuminated sample (e.g., one or more images), at step 304. The order of steps 302 and 304 can be changed, and these steps can be performed in parallel or in a repeating fashion until the image set is captured. Also, other steps can be used, such as generating a composite image or partial computational image of the sample.

A processor of microscope 100, such as controller 106, tests whether an area of at least one image has artifact and/or empty space, at step 306. For example, the processor may scan sample 200 and identify areas 202 and/or 203 as empty or having artifact, e.g., having no discernible viewing interest. Alternatively or in combination, information from a plurality of images, such as a computational image or appearance of artifacts in several images, can be used with step 306. In some embodiments, the processor is configured with instructions to search for valid data, and determine that the area is empty or contains artifacts if the amount of valid data found in the area is under a threshold amount or does not meet a defined criterion for valid data. For example, the processor can be configured with instructions to identify areas comprising artifact or empty space, or instructions to identify valid data, and combinations thereof. The processor can be configured with instructions to separately test for each of artifacts or empty space, either separately or in combination.

The area or regions of the sample under test can be provided in step 306 in many ways and in some embodiments without steps 302 and 304. For example, the area under test can be provided to the processor and processed to determine whether the area has valid data, artifact or empty space. Any source of image data as described herein can be used to perform the test at step 306.

At step 308 the processor determines whether an area has artifact and/or empty space.

The test for artifact and/or empty data can be configured in many ways either alternatively or in combination. For example, the test can be performed on a composite image or a computational image or from analyzing similarities or differences between images (e.g a portion which may look like valid data in a single image or some of the images may not be present in other images and may be interpreted as an artifact). Also, the test can be performed on any one or more images of the image set, or any portion of the one or more images of the image set, or other image data for example. This test can be configured to determine when there is valid data, artifacts or empty space. Also, the testing can be configured to provide statistical data such as a probability that the area or region comprises, valid data, artifacts, or empty space, as described herein. The probability can be used to suggest that the tested area or region comprises valid data, artifacts, or empty space. Also, additional or alternative metrics to probability can be used, such as analysis of spatial frequencies, to test the area or region. In this regard, the test can determine whether the area potentially has artifact. At step 308, the "yes" or "no" test can be performed based on a statistical or other analysis to alter the process as described herein.

If the area comprises artifact or empty space, the processor may direct microscope 100 to skip the area and/or only partially process the area to reduce computational imaging at step 310. This process can be employed during the acquisition of images with the image capture device, or later during the image reconstruction process, and combinations thereof. If the area does not comprise artifact or empty space, the area can be process with high resolution at step 314. Although a high resolution process is shown, other processes can be performed either alternatively or in combination. The process may improve other aspects of the image related to image quality, such as quality improvement, aberration correction, computational refocusing, contrast enhancement, distortion correction, color enhancement, registration, removing identified elements of the data. In some embodiments, the removed identified elements of the data comprise one or more of artifact, dust or empty space.

The processor may also flag the areas having artifact and/or empty space for subsequent imaging at step 312. For example, as microscope 100 initiates more in-depth computational imaging of the sample, those areas of the sample that are of little or no interest may be flagged such that microscope 100 forgoes any additional processing of those areas.

At a step 316, the imaging process moves to the next area of the sample.

Figure 4:
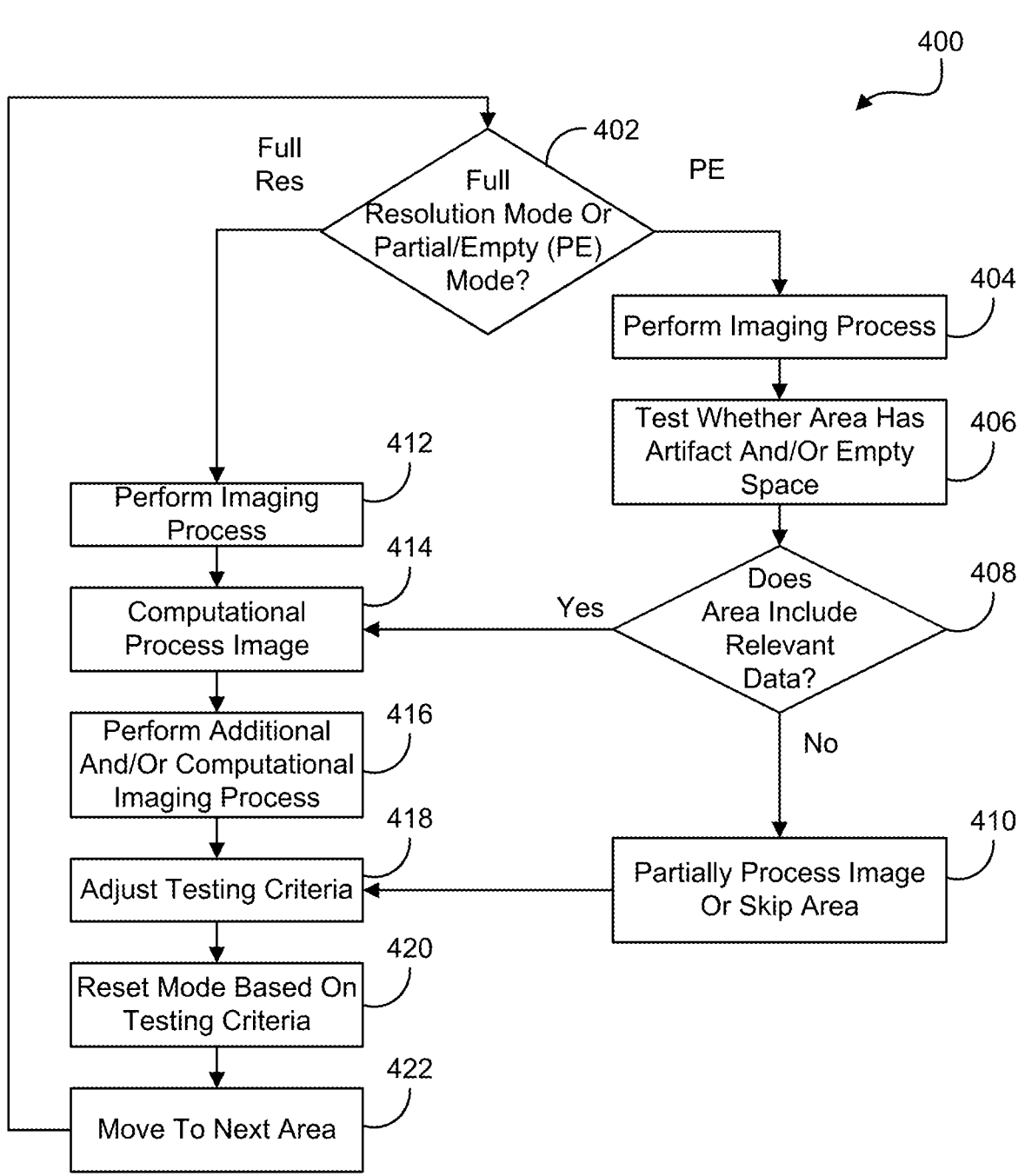
FIG. 4 is a flowchart showing another exemplary process for accelerating digital microscopy scans using an empty and/or dirty area detection, in accordance with some embodiments of the present disclosure.

FIG. 4 is a flowchart showing another exemplary process 400 for accelerating digital microscopy scans using artifact and/or dirty area detection. In this embodiment, the processor of microscope 100 determines whether microscope 100 is in a full resolution mode or a partial/empty (PE) mode, at step 402. For example, if microscope 100 was scanning in region 201 of sample 200 of FIG. 2, microscope 100 would typically employ full resolution imaging. Accordingly, microscope 100 may remain in the full resolution mode and assume that data in a next area is of interest. In this regard, the processor may perform an imaging process on that subsequent area at step 412.

In some embodiments the microscope processor can be configured with one mode, and the mode selection described herein is optional. e.g. only one mode, which tests for empty or dirty areas while processing full resolution images, or PE mode without switching to full resolution mode.

The processor may then computationally process the image at step 414 to generate a computational image. Generally, a computational image is an image where at least a part of the image was created using a computational process. For example, a computational process may include resolution enhancement and/or quality improvement, such as, aberration correction, computational refocusing, contrast enhancement, distortion correction, color enhancement, registration, and/or removing certain elements of the data such as debris, dust, and/or empty space. Some processes that may be applied to areas that are empty or dirty (e.g., areas 202 and 203 of FIG. 2) include the computational removal of dirt and/or artifacts related to it, full resolution or quality enhancement, partial resolution or quality enhancement, and empty resolution enhancement (e.g., by increasing the pixel count without improving the optical resolving power, also known as interpolation).

In this regard, the processor of microscope 100 may perform additional and/or computational imaging processes if the area being observed is also being tested, at step 416. Step 416 is an optional step, and can depend on other aspects of the work flow and process 400 and other processes and methods as described herein. For example, step 416 can be performed when the microscope has identified an area as having relevant data and partially constructed the image as part of step 404. Alternatively, step 416 can be skipped, for example when the process comprises the full resolution mode, and process 414 has generated the computational image.

Thereafter, the processor may adjust the testing criteria used for testing particular area, at step 418. This may allow the processor to change modes from full resolution mode to PE mode. For example, as the processor is testing an area of the image, the processor may deem the area as either empty or dirty before proceeding to a subsequent area. As a subsequent area may likely be empty or dirty as well, the processor may switch to the PE mode at step 420 for the subsequent area. Conversely, if the processor encounters valid data (e.g., a portion of the image occupied by region 201 of FIG. 2), the processor may be determined that a subsequent region may also comprise valid data. In this regard, the processor may set microscope 100 to operate in the full resolution mode at step 420. Although reference is made to the full resolution mode, the full resolution mode may comprise one or more additional or alternative computational processes generally related to the quality of the image, such as aberration correction, etc.

Microscope 100 may move on to the next area, at step 422, and returned to step 402. If there is no reason to change the testing criteria (e.g., because the current mode of microscope 100 is likely to be used in a subsequent area), the processor may direct microscope 100 to simply move on to the next area, at step 422.

Returning to step 402, if the processor determines that microscope 100 is operating in the PE mode, the processor may direct microscope 100 to perform an imaging process, at step 404. For example, the processor may form a partial imaging of an area and then test whether the area has debris and/or empty space, at step 406. In some embodiments, the partial or full imaging partial process may be limited to the computational process, while other processes such as image illumination and acquisition continue. This partial imaging may reduce the computational complexity and thus reduce the number of computations used in the imaging. Then, the processor may they determine whether the area includes relevant data or not, at step 408.

If the area does include relevant data, the processor may direct microscope 100 to operate in full resolution mode and generate a computational process image, at step 414. Otherwise, the processor may partially process the image or even skip over the entire area, at step 410.

Any of the steps of method 400 can be combined with any method step corresponding to a block of workflow 300 as described herein. Although workflow 300 and method 400 are described as a sequence of steps, in some embodiments various concurrent iterations may result in steps being stalled, omitted, repeated, and/or performed in different order. The steps disclosed herein are optional, e.g. steps 302 and 304, and can be performed in any order.

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or nonvolatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or comprise additional steps in addition to those disclosed.

The processor as disclosed herein can be configured to perform any one or more steps of a method as disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of" Finally, for ease of use, the terms "including" and "having" (and their derivatives), as used in the specification and claims, are interchangeable with and have the same meaning as the word "comprising." Also, as used herein the term "multiple" encompasses a "plurality" and refers to two or more.

This disclosure also includes the following numbered clauses

Clause 1. A microscope, comprising:

an illumination assembly operable to illuminate a sample under observation of the microscope;

an image capture device operable to capture an initial image set of the illuminated sample; and a processor coupled to the image capture device and configured with instructions to identify an area of the sample that comprises at least one of artifact or empty space, and to determine a process for generating a computational image of the sample in response to identifying the area.

Clause 2. The microscope of clause 1, wherein:

the processor is configured to output to a display portions of the computational image of the sample that comprise the at least one of artifact or empty space at a higher rate than other portions of the computational image of the sample that do not comprise the at least one of artifact or empty space.

Clause 3. The microscope according to any of clauses 1 to 2, wherein:

the processor is configured with instructions to operate in a first mode in response to identifying the area of the sample comprising the at least one of artifact or empty space and in a second mode in response to identifying an area of the sample that does not comprise the at least one of artifact or empty space; and in the first mode and the second mode the processor is configured to output portions of the computational image with a first spatial resolving power and second spatial resolving power, respectively, the first spatial resolving power less than the second spatial resolving power.

Clause 4. The microscope according to any of clauses 1 to 3, wherein:

the image set comprises a plurality of regions;

the processor is configured with instructions to run a first process to increase spatial resolving power of each of the plurality of regions and to run a second process to determine whether each of the plurality of regions comprises the at least one of artifact or empty space;

optionally the second process is initiated before the first process has completed; and optionally the first process is stopped in response to the second process identifying one or more of the plurality of regions comprising the at least one of artifact or empty space.

Clause 5. The microscope according to any of clauses 1 to 4, wherein:

the illumination assembly is configured to illuminate the sample at a plurality of illumination conditions and the image capture device generates a plurality of images, each of the plurality of images corresponding to a different illumination condition; and the computational image is generated from the plurality of images;

the at least one of artifact or empty space is identified from the computational image or one or more of the plurality of images; and the plurality of illumination conditions comprises at least one of an illumination angle, an illumination wavelength, or an illumination pattern.

Clause 6. The microscope according to any of clauses 1 to 5, wherein:

the processor comprises instructions to detect an area of the sample that comprises at least one of artifact or empty space, by using one or more of: a classifier, a detail in a darkfield image, a brightness, a color distribution, a cross correlation, a Fourier analysis, an entropy, a feature detection, a shift of details, a sparsity, an edge detection, a three-dimensional reconstruction, a depth detection, or a light field.

Clause 7. The microscope according to any of clauses 1 to 6, further comprising:

an input comprising pixels from an image set of the sample, and an output comprising the at least one of artifact or empty space.

Clause 8. The microscope according to any of clauses 1 to 7, wherein:

the computational image comprises a two-dimensional image.

Clause 9. The microscope according to any of clauses 1 to 8, wherein:

the computational image comprises one or more of a three-dimensional image or a three-dimensional model of the sample.

Clause 10. The microscope according to any of clauses 1 to 9, further comprising:

another image capture device with a higher resolving power than said image capture device, the other image capture device being used to image the sample at the higher resolving power than said image capture device.

Clause 11. The microscope according to any of clauses 1 to 10, wherein:

the initial image set image comprises a preview image; and the processor is configured with instructions to determine a boundary of the sample in the preview image, and to generate another image of the sample, wherein the other image comprises a higher resolving power within the boundary of the of the sample and a lower resolving power in the identified area.

Clause 12. The microscope according to any of clauses 1 to 11, wherein:

the higher resolving power corresponds to smaller spatial features being resolved than the lower resolving power.

Clause 13. The microscope according to any of clauses 1 to 12, wherein:

the computational image comprises a digital image; and the processor is configured with instructions to remove data pertaining to the identified area to change a resolving power of the identified area.

Clause 14. The microscope according to any of clauses 1 to 13, wherein:

the processor is configured with instructions to identify the area as comprising the at least one of artifact or empty space in response to a shift in position of portions of the image set or computational image in response to an off-axis illumination of the sample.

Clause 15. The microscope according to any of clauses 1 to 14, wherein:

the microscope comprises a computational microscope configured to generate an image from a plurality of images of the sample with different illumination conditions; and the illumination different conditions comprise at least one of different illumination angles, different illumination wavelengths, different illumination patterns, different illumination durations, different illumination intensities, or different illumination positions.

Clause 16. The microscope according to any of clauses 1 to 15, further comprising:

a translation stage to move the sample to a plurality of locations in order to scan the sample and generate a plurality of images, wherein the microscope is configured to scan the sample faster in response to the area that comprises at least one of artifact or empty space as compared to the scan speed of an area of the sample that comprises a valid portion of the sample.

Clause 17. The microscope according to any of clauses 1 to 16, wherein:

the image capture device captures the initial image set of the illuminated sample using a plurality of illumination conditions for illuminating the sample; and the plurality of illumination conditions comprises at least one of different illumination angles, different illumination wavelengths, different illumination patterns, different illumination durations, different illumination intensities, or different illumination positions.

Clause 18. The microscope according to any of clauses 1 to 17, wherein:

a higher resolving power portion of the image comprises resolved details with a smaller spatial distance than resolved details of a lower resolving power portion of the image.

Clause 19. The microscope according to any of clauses 1 to 18, wherein:

the processor is configured with instructions to reduce computational complexity when processing in the area of the sample that comprises the at least one of artifact or empty space to reduce computation time.

Clause 20. The microscope according to any of clauses 1 to 19, wherein:

the processor is configured with instructions to use fewer illumination conditions when processing in the area of the sample that comprises the at least one of artifact or empty space as compared to an area of the sample that does not comprise the at least one of artifact or empty space.

Clause 21. The microscope according to any of clauses 1 to 20, wherein:

the computational image comprises a first area comprising a first resolving power and a second area comprising a second resolving power less than the first resolving power and optionally wherein the second area corresponds to the at least one of artifacts or empty space of the sample.

Clause 22. The microscope according to any of clauses 1 to 21, wherein:

a low resolving power portion of the computational image comprises an image with a resolving power similar to a resolving power of the image set and optionally similar to within about 25 percent.

Clause 23. The microscope according to any of clauses 1 to 22 wherein:

the computational image is generated from a computational process comprising one or more of resolution enhancement, quality improvement, aberration correction, computational refocusing, contrast enhancement, distortion correction, color enhancement, registration, removing identified elements of the data and optionally wherein the removed identified elements of the data comprise one or more of artifact, dust or empty space.

Clause 24. The microscope according to any of clauses 1 to 23 herein wherein:

the microscope comprises a computational microscope.

Clause 25. The microscope according to any of clauses 1 to 24 wherein:

a portion of the computational image corresponding to the area of the sample that comprises the at least one of artifact or empty space is generated with computational removal of dirt related artifacts, full resolution enhancement, partial resolution enhancement or pixel resolution enhancement without increasing spatial resolving power of the portion and optionally wherein the portion comprises an increased pixel count without increasing the optical resolving power and optionally wherein the portion is generated with interpolation.

Clause 26. The microscope according to any of clauses 1 to 25 wherein:

a portion of the computational image corresponding to the area of the sample that comprises the at least one of the artifact or empty space is generated without a computational process that alters the portion image.

Clause 27. The microscope according to any of clauses 1 to 26 wherein:

the artifact comprises one or more of particulate matter, debris, dirt, dust, or smudges.

Clause 28. The microscope according to any of clauses 1 to 27, wherein:

a portion of the computational image corresponding to the area comprising the at least one of artifacts empty space is left blank in the computational image and optionally in response to skipping the area or determining not to display the area in order to reduce data storage.

Clause 29. The microscope of any one of clauses 1 to 28 wherein:

the processor is configured with instructions to search for valid data, and determine that the area is empty or contains artifacts if the amount of valid data found in the area is under a threshold amount or does not meet a defined criterion for valid data.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of imaging with a microscope, comprising:

receiving, with a processor, an initial image set of an illuminated sample with an image capture device, the sample having been illuminated under observation of the microscope with an illumination assembly;

identifying an area of the sample that comprises at least one of artifact or empty space; and determining a process for generating a computational image of the sample in response to identifying the area, wherein the process includes imaging at full resolution for portions of the computational image that do not comprise the at least one of artifact or empty space.

2. The method of claim 1, wherein the full resolution imaging includes computational refocusing.

3. The method of claim 1, wherein the full resolution imaging includes aberration correction.

4. The method of claim 1, wherein the portions of the computational image that do not comprise the at least one of artifact or empty space correspond to valid data.

5. The method of claim 1, wherein a higher resolving power portion of the image comprises resolved details with a smaller spatial distance than resolved details of a lower resolving power portion of the image.

6. The method of claim 1, wherein the computational image comprises a first area comprising a first resolving power and a second area comprising a second resolving power less than the first resolving power and optionally wherein the second area corresponds to the at least one of artifact or empty space of the sample.

7. The method of claim 1, wherein a low resolving power portion of the computational image comprises an image with a resolving power similar to a resolving power of the image set and optionally similar to within about 25 percent.

8. The method of claim 1, wherein the computational image is generated from a computational process comprising one or more of resolution enhancement, quality improvement, aberration correction, computational refocusing, contrast enhancement, distortion correction, color enhancement, registration, removing identified elements of data and optionally wherein the removed identified elements of the data comprise one or more of artifact, dust or empty space.

9. The method of claim 1, wherein the microscope comprises a computational microscope.

10. The method of claim 1, wherein a portion of the computational image corresponding to the area of the sample that comprises the at least one of artifact or empty space is generated with one or more of computational removal of dirt related artifacts, full resolution enhancement, partial resolution enhancement or pixel resolution enhancement without increasing spatial resolving power of the portion and optionally wherein the portion comprises an increased pixel count without increasing optical resolving power and optionally wherein the portion is generated with interpolation.

11. The method of claim 1, wherein a portion of the computational image corresponding to the area of the sample that comprises the at least one of artifact or empty space is generated without a computational process that alters the portion.

12. The method of claim 1, wherein a portion of the computational image corresponding to the area comprising the at least one of artifact or empty space is left blank in the computational image and optionally in response to skipping the area or determining not to display the area in order to reduce data storage.

13. The method of claim 1, further comprising:

searching for valid data; and determining that the area is empty or contains artifacts if an amount of valid data found in the area is under a threshold amount or does not meet a defined criterion for valid data.

14. The method of claim 1, further comprising:

receiving an image of the sample at a higher resolving power than said image capture device using another image capture device with a higher resolving power than said image capture device.

15. The method of claim 1, wherein the computational image comprises a two-dimensional image.

16. The method of claim 1, wherein the computational image comprises one or more of a three-dimensional image or a three-dimensional model of the sample.

17. The method of claim 1, further comprising:

detecting the area of the sample that comprises the at least
one of artifact or empty space, by using one or more of:
a classifier, a detail in a darkfield image, a brightness,
a color distribution, a cross correlation, a Fourier
analysis, an entropy, a feature detection, a shift of
details, a sparsity, an edge detection, a three-dimen-
sional reconstruction, a depth detection, or a light field.

18. The method of claim 1, wherein the artifact comprises
one or more of particulate matter, debris, dirt, dust, or
smudges.

\* \* \* \* \*